Sept. 18, 1951 J. O. GARRISON 2,568,493
THERMOTEST CABINET

Filed April 19, 1947 3 Sheets-Sheet 1

Inventor
James O. Garrison
By J. L. Walker
Attorney

Sept. 18, 1951  J. O. GARRISON  2,568,493
THERMOTEST CABINET

Filed April 19, 1947  3 Sheets-Sheet 2

Inventor
James O. Garrison
By J. L. Walker
Attorney

Sept. 18, 1951  J. O. GARRISON  2,568,493
THERMOTEST CABINET

Filed April 19, 1947  3 Sheets-Sheet 3

Inventor
James O. Garrison
By J. L. Walker
Attorney

Patented Sept. 18, 1951

2,568,493

UNITED STATES PATENT OFFICE 2,568,493

THERMOTEST CABINET

James O. Garrison, Dayton, Ohio, assignor to Garrison Machine Works, Inc., Dayton, Ohio, a corporation of Ohio Application April 19, 1947, Serial No. 742,536

5 Claims. (Cl. 219—19)

This invention pertains to a thermal conditioning system, and more particularly to a thermal cabinet within which precision measuring instruments may be used whereby the calibration of such instruments may be maintained constant, and machined parts having close tolerances may be accurately and easily measured and assembled under varying working conditions.

Measuring instruments such as various type gages and the like, are quite susceptible to change of size, alignment and variation of indicated values under influence of temperature change of the surrounding atmosphere, and even as a result of handling or radiated heat from the operator's body. Likewise machined parts, having close tolerances are subject to expansion and contraction which hinders, and in some cases prevents the assembly thereof.

It is not an unusual experiment of mechanics to engage a work piece or block in a micrometer under sufficient tension to resist gravity, and then grasp the micrometer frame momentarily in the operator's hand, whereupon the work piece will be released and drop from the instrument by gravity, due to slight expansion or warping of the micrometer frame. Obviously, under such condition the instrument would give a false indication of size, or different indications of the size of the same piece under different thermal conditions.

Under manufacturing conditions and tolerances which prevailed until comparatively recent times, minute variations of size due to temperature change incident to fluctuations of room temperature or handling were negligible and deemed unimportant.

However, under modern high precision engineering practice, wherein permitted maximum tolerances of one-ten thousandth of an inch are common, and tolerances of one hundred thousandth of an inch or less not unusual, there is presented a highly important problem of minimizing distortion, warping and change in size of measuring instruments and machined parts incident to thermal change.

In the present instance there is contemplated means for thermal conditioning such measuring instruments or finished parts, and maintenance of a constant temperature condition around such instruments and parts by provision of a cabinet within which air of substantially constant temperature is circulated, the circulating air being subjected to varying degree of additional heat, the amount of additional heat being determined by the amount of external heat absorbed by the circulating air, or dissipation of heat therefrom incident to surrounding conditions or the insertion of cold objects into the cabinet.

The object of the invention is to provide a calibration maintenance cabinet for precision measuring instruments and parts which will not only be simple and economical in construction and application, but will be efficient in use, automatic in operation, uniform in action, having minimum parts, and be unlikely to get out of repair.

A further object of the invention is to materially increase the accuracy of precision measuring instruments under different external operating conditions.

A further object of the invention is to enable automatic maintenance of calibration of measuring instruments and size of finished parts under varying external conditions.

A further object of the invention is to maintain measuring instruments in constant operating condition and eliminate the necessity for a preliminary warming up or stabilizing period.

A further object of the invention is to enable maintenance of dimension of precision machined parts to facilitate the assembly thereof.

A further object of the invention is to provide a means whereby instruments and objects may be handled as long as necessary without changing their size or shape.

A further object of the invention is to provide for use with precision measuring instruments and finished parts an operating cabinet having automatic constant thermal control, the advantageous structural features and inherent meritorious characteristics and mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

The present thermal cabinet is usable with a wide variety of measuring instruments, machined parts and analogous devices, and for illustrative purposes, but with no intent to unduly limit the scope or application of the invention, has been shown as a relatively small portable cabinet.

In the drawings.

Like parts are indicated by similar characters of reference throughout the several views.

One of the primary objects of the present invention is to introduce laboratory high precision methods into production shop practice, and make such application practical to every day manufacturing problems. The present thermal control system eliminates the necessity of making more or less frequent adjustments of gages or other instruments to compensate for fluctuation of room temperature or outside weather conditions. It maintains the calibration constant regardless of the fact that the temperature in the shop may vary considerably during a twenty-four hour period. It is frequently found that without such control measuring instruments may operate better and more accurately during certain periods of the day than they do at other times, and that as a result there may be variations in the result, which according to present day precision standards, may be deemed serious.

The present thermo-cabinet comprises a box-like structure 1, having a frontal access opening 2 in relative spaced relation with the edges thereof. Hinged to the upper portion of the front panel 3 is a transparent plate 4 which covers approximately three-fourths of the area of the opening 2. The remaining uncovered portion of the opening permits insertion of the operator's hands and arms into the cabinet to enable manipulation of the various gages, instruments or other objects housed therein.

The transparent plate 4 permits unobstructed observation of the operations performed within the cabinet by the operator, who stands or sits on the outside thereof. Swinging of the plate 4 about its hinged support makes the interior of the cabinet easily accessible for the insertion or removal of the measuring instruments or the work pieces to be measured.

Figure 9:
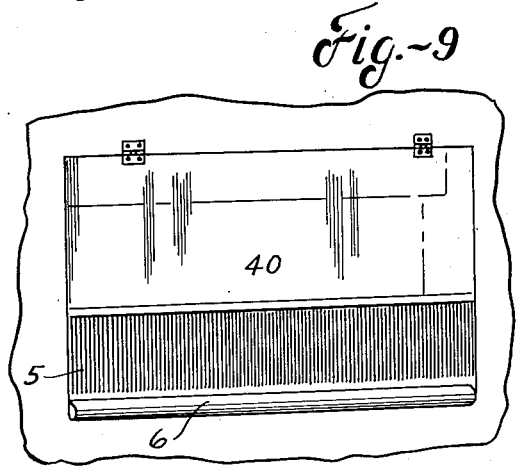
Fig. 9 is a modified form of closure for the access opening.

It has been found that very little, if any, heat is lost through the uncovered portion of the opening 2. However, if the cabinet is located so that it is subject to extreme conditions of temperature, the normally uncovered portion of the opening 2 may be closed by use of ropes 5 or other flexible closure means suspended from the lower margin of the plate 4 as shown in Fig. 9. By such means, the opening may be substantially closed, while permitting free movement of the operator's arms within the opening. The ropes 5 being flexible, are easily displaced by the operator's arms, but nevertheless substantially conform thereto, so that the opening is substantially completely sealed against the ingress or egress of cooling or heating influence.

Supported upon the lower margin of the opening 2 is a resilient pad 6 which serves as an arm rest for the operator while manipulating any one of the various instruments that may be located within the cabinet.

A false floor 7 is also provided for rigidity and to protect the instruments within the cabinet from outside temperature influence which might be transmitted through the bottom panel 8 of the cabinet 1. This floor 7 is supported in spaced relation with the bottom panel 8 throughout its entire area by the longitudinally extending spacers 9.

The top rear portion of the cabinet 1 is recessed as at 10 within which recess the temperature control units are mounted. When assembled, with the control units in place, the recess is enclosed by a wire mesh cover 11. The cover may be fitted with locks to prevent tampering if deemed necessary.

Removably supported within the recess 10 is a sub-base 12 upon which the temperature regulating means is mounted. The sub-base is secured in adjusted position within the recess in aligned relation with the elongated slots 14 and 15 in the horizontal and vertical walls 16 and 17, respectively. Mounted upon the sub-base 12 is a series of temperature control units 18, through which the air within the cabinet is circulated.

Each of the units 18 comprises a boxlike structure within which a heater coil 19 is mounted, past which coil the air is circulated. Immediately above the coil 19 is a micro-switch 20, the operation of which controls the energization of the heater coil.

The switch 20 is operated by means of a thermostat 21 which is supported from the top of the unit 18 by an adjusting screw 22. The vertical location of the thermostat relative to the switch is adjusted by rotation of the screw 22 relative to the boss 23 upon the top of the unit 18, the thermostat being locked in adjusted position by the thumb nut 24. An increase in the temperature to which the bellows 21 is subjected, causes the expansion of said bellows thereby depressing the actuator for the switch 20. Upon depression of the switch actuator, the electrical circuit for the heater coil 19 is interrupted, thereby de-energizing the coil until such time as the thermostat again contracts. Adjustment of the thermostat 21 away from or toward the switch 20 determines the temperature at which the thermostat is effective to de-energize the heater coil 19. Progressive adjustment of the thermostat away from the switch progressively increases the temperature at which the coil is de-energized.

Mounted on the side of the unit 18 is a centrifugal air impeller 25, the intake or suction side thereof communicating with the interior of the unit 18 through the port 26. The discharge side of the impeller communicates with the elongated slot 15 in the vertical wall 17 of the recess through the discharge port 27 in the vertical portion of the sub-base 12. The interior of the unit 18 being under suction influence of the impeller 25, air from the cabinet is drawn through the slot 14 in the horizontal wall 16 of the recess and through the intake port 28 in the sub-base 12 into the interior of the unit 18.

Figure 3:
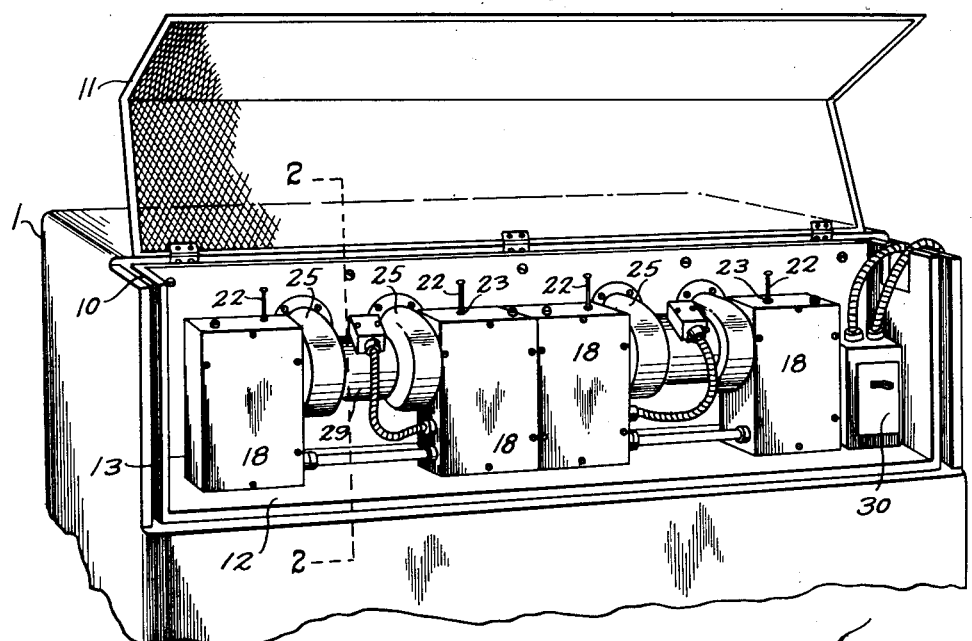
Fig. 3 is a fragmentary perspective view of the rear of the cabinet showing the temperature control units.
Figure 5:
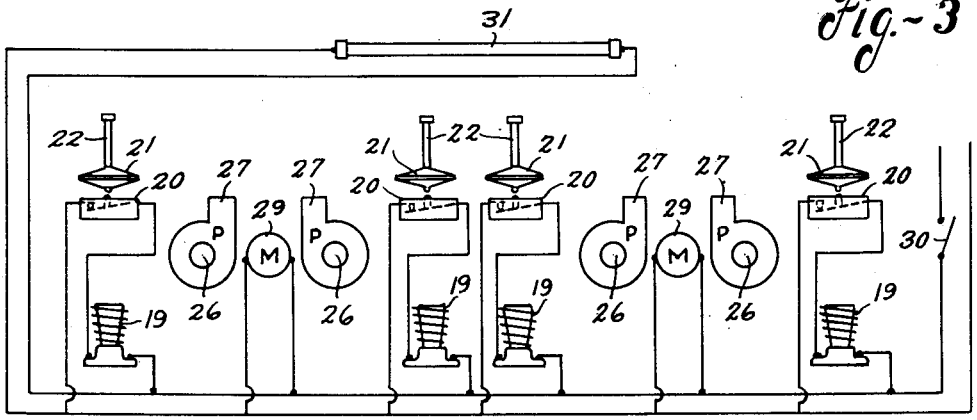
Fig. 5 is a schematic wiring diagram for the several electrical circuits.
Figure 4:
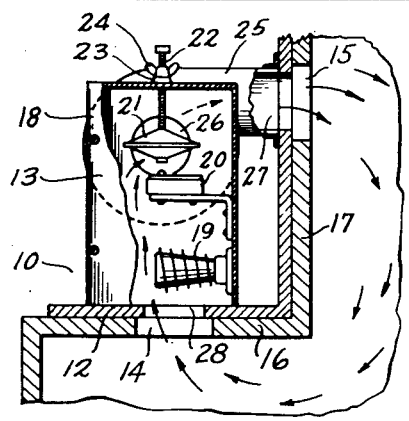
Fig. 4 is a fragmentary sectional view of one of the temperature control units, the housing of which has been broken away to show the interior thereof.

As shown in Fig. 3, the temperature controls within the recess 10 comprise four units 18 and four air impellers 25. As shown, the units 18 are right and left hand units, which permits the use of one motor 29 for two impellers, the impellers being mounted upon opposite ends of the motor shaft.

The motors 29 operate continuously upon closing of the main power switch 30, but the heating units 18 are independently controlled by their individual thermostats 21. A fluorescent or other light 31 is also provided to illuminate the interior of the cabinet.

During use, the air is continually circulated within the cabinet, by the impellers 25. The temperature of the air as it leaves the heating units 18 and enters the impeller 25 controls the operation of the heater coils 19. It should be noted that the thermostat 21 is placed in the airstream intermediate the heater 19 and the intake to the impeller 25. With such construction the air discharged into the cabinet by the impeller is maintained at a substantially constant temperature, equal to the temperature desired in the interior of the cabinet.

Figure 2:
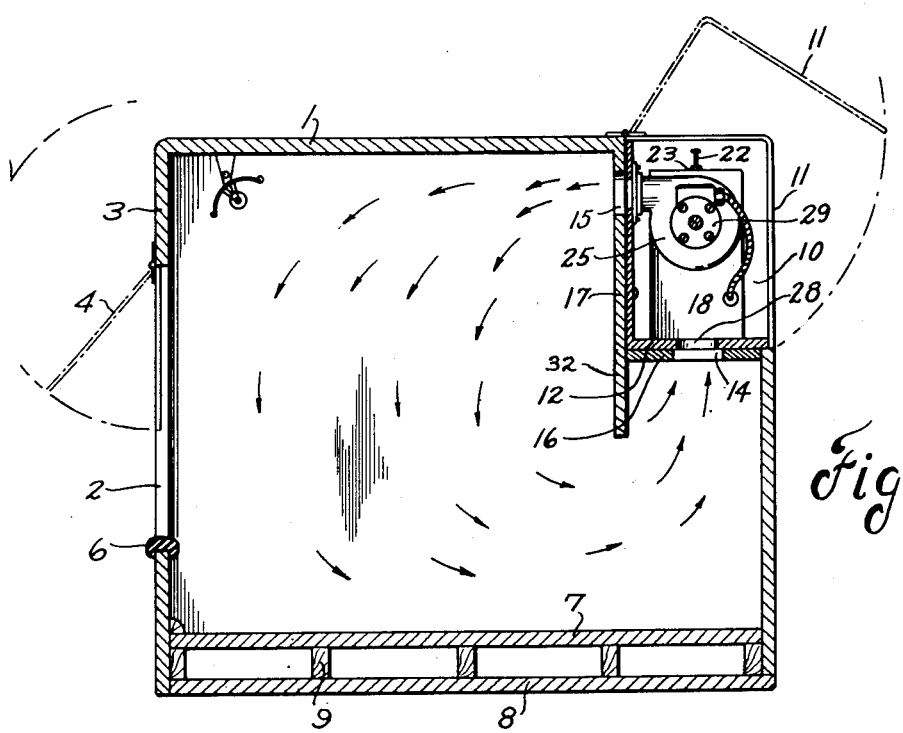
Fig. 2 is a sectional view of the assembled cabinet taken approximately on line 2—2 of Fig. 3.

Depending from the front of the recess 10 in substantially aligned relation with the front wall 17 thereof, is a baffle 32. This baffle is so positioned as to cause the air to fully circulate throughout the interior of the cabinet as is shown by the arrows in Fig. 2. Were it not for the baffle, the lower strata of air within the cabinet would have a tendency to stagnate since the impeller 25 would draw air from the strata immediately beneath the recess 10. Without the baffle the heated air tends to circulate directly from the discharge port 15 to the intake port 14 of the recess without complete circulation throughout the interior of the cabinet.

In operation the box temperature is maintained at body temperature. This has been found to be the best general temperature, since it is conducive to more accurate operation of the instruments. The instruments to be used are calibrated at the temperature of the cabinet and, being kept therein, are always at a constant temperature. The pieces to be handled are placed in the cabinet before actual operations begin, so that the pieces may become stabilized at substantially the same temperature. As a result thereof the temperature of the instrument and the work piece is maintained uniform at the established temperature level at which the instrument is calibrated. Consequently, work done with the instrument while at such established and uniformly maintained temperature will always be uniformly accurate. The operator's hands will have no effect upon the operation of the instrument or the accuracy of its work, since there is no heat transfer from the operator to the instrument and work piece, or vice versa.

Figure 6:
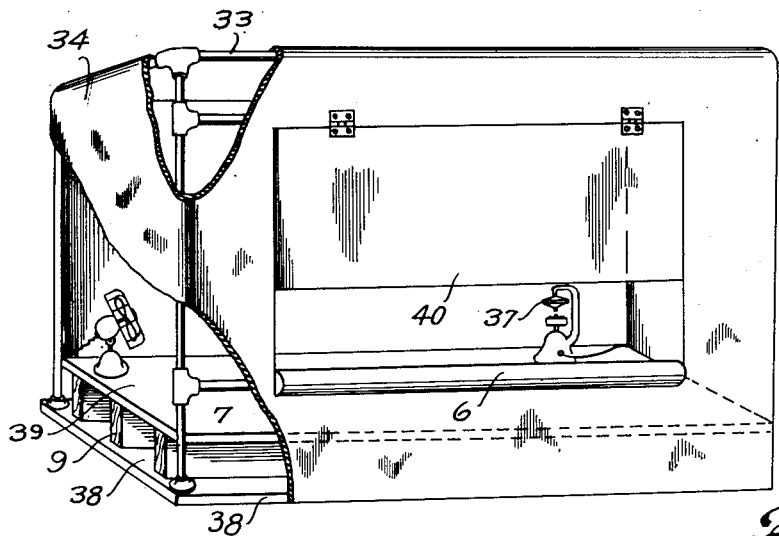
Fig. 6 is a perspective view, partly in section, of a modified form of cabinet employing a "knock-down" type of construction.
Figure 8:
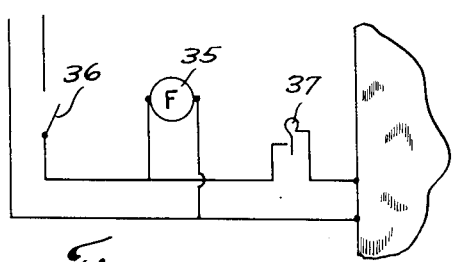
Fig. 8 is a schematic representation of a modified wiring diagram.

In Fig. 6 is shown a knock-down type of cabinet which may be used in the same way as the cabinet shown in Figs. 1 to 5. The frame work of this cabinet comprises a series of pipe lengths 33 which may be easily assembled to form the cabinet frame. Over the frame is placed a cover or envelope 34 of conductive rubber or any type electric blanket which supplies the necessary heat for the cabinet. Such blanket may be obtained on the open market, and can be fabricated to any desired form. The wiring diagram for this type of cabinet is shown in Fig. 8, wherein the fan 35 is connected across the power lines and is continuously operative when the main switch 36 is closed. The energization and de-energization of the enclosure 34 is controlled by a thermostat 37 which is placed within the cabinet and is responsive to the air temperature therein. The pipe frame work 33 is supported upon a wood base 38 upon which the false floor 39 is also supported in relative spaced relation therewith. The thermostat 37 and fan 35 are loosely supported upon floor 39 and may be moved thereabout. The fan 35 is preferably, but not necessarily directed toward a top corner of the cabinet to increase the agitation and turbulence of the aid within the cabinet.

Figure 1:
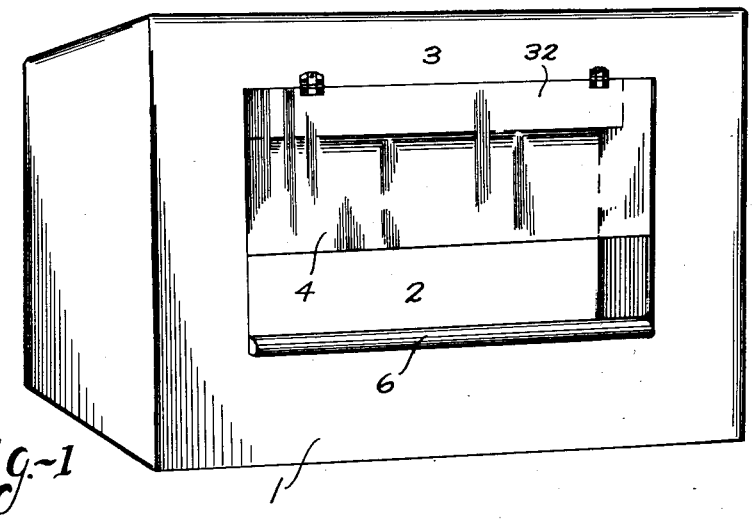
Fig. 1 is a perspective view of the assembled cabinet showing the access opening through which the operator works.

Like the form shown in Fig. 1, the present form of cabinet also has a transparent cover member 40 which overlies the greater portion of the access opening in the front of the enclosure 34.

Figure 7:
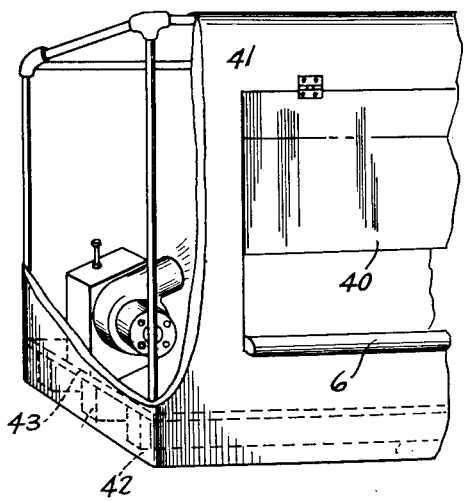
Fig. 7 is a perspective view, partly in section, of a further modification of a "knock-down" type of cabinet.

A further modification is shown in Fig. 7 wherein the cabinet is formed by a double wall inflatable balloon type enclosure 41 which is secured to the double floor assembly 42—43. This form of cabinet may be heated either by the use of conductive rubber or electric blankets as shown in Fig. 6, or by use of one or more of the heating units 18 and impellers 25 of Figs. 3 and 4. If the conductive rubber or electric blanket is used, the sheets thereof may be suspended within the enclosure 41, and the thermostat and fan arrangement of Fig. 8 used to control the temperature within the cabinet. Should the units 18 and impellers 25 be used to heat the cabinet formed by the enclosure 41, they are placed upon the floor 43, with the discharge from the impeller directed diagonally upward so as to continually move and agitate the air within the enclosure.

The forms shown in Figs. 6 and 7 have the advantage of being collapsible which greatly facilitates the packing and shipment of the test cabinets.

While the present thermal control cabinet is especially designed for use in the shop on production items, it is applicable to a wide range of other uses, as for example, the maintenance of "standard" equipment used in the calibration of other equipment, and other types of general laboratory use. The usual deviation and resulting inaccuracy of instruments under influence of external temperature conditions, and particularly that due to the warming effect of the operator's hands is completely eliminated.

When used in the shop as a part of the general shop practice, the present method of automatic temperature compensation enables maintenance of such "standard" conditions under all operating conditions and obviates the necessity for computation and compensating adjustment. Although some effort has been made in the past to air condition entire rooms in an attempt to accomplish the results of the present cabinet, such methods have not proven highly successful or entirely satisfactory. The expense necessary to air condition an entire room is almost prohibitive, plus the fact that it is impossible to maintain a substantially constant temperature within the special room. Opening of a door into the special room creates a draft which if it strikes an instrument, immediately causes a change in the instrument calibration. The presence of a varying number of operators within the room also causes fluctuations in the degree of temperature within the room, since a system of that size is not, and cannot be made to be, quickly responsive to fluctuations in external heat. The present cabinet, being of relatively small area, responds much more quickly to variations in temperature within the cabinet, and of primary importance is the fact that the interior of the cabinet is not subjected to violent fluctuations of external heat. Being of small area, and having only the operator's hands within the cabinet, the heat regulating equipment is not called upon to compensate for extreme fluctuations in temperature.

Furthermore, the present cabinet makes it possible for small manufacturers to have accurate instruments whereas the cost of an air conditioned room would be out of the question. It further simplifies and expedites production since cabinets may be advantageously placed throughout the shop permitting inspection and checking on the spot. Where an air conditioned room is maintained, all parts must be transported from the shop to the centralized inspection room, and then returned to the assembly lines.

The cabinet also has wide usage as a means of assembling precision made machined parts. Machined parts are quite susceptible to expansion and contraction caused by handling, or uneven application of thermal influences thereon while laying on work benches. With minimum tolerances encountered in present day production, this expansion and contraction of the machined parts becomes very detrimental since it is not at all uncommon for such parts to become incapable of assembly. The parts, when distributed loosely upon a work bench are subjected to varying degrees of thermal influence, and even react to handling by the operator. As a result, all of the parts do not expand or contract evenly, and when of varying size, they can not be properly assembled. To overcome this difficulty, a plurality of the present cabinets are placed on the assembly line, and the various parts to be assembled are placed therein. After becoming stabilized at the temperature of the cabinet, they will all be of the proper size, since such parts were presumably inspected at the stabilized temperature in the production department. The parts are then assembled within the cabinet, which assembly is greatly facilitated by the parts being of stabilized dimension. The body heat of the operator's hands does not affect the parts, since the cabinet temperature is approximately that of the operator's hands.

Thus intricate assembly operations of precision parts which is normally quite difficult because of unequal expansion and contraction of the individual parts is made easy and accurate by use of the present cabinet which stabilizes part size by control of temperature.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A thermal cabinet within which the manufacture, inspection or assembly of precision parts may be accomplished by an operator on the exterior thereof, having an access opening therein through which the operator's hands and arms may be inserted, a closure member for the opening, an air circulator continuously moving the air within the cabinet, a heater to the influence of which the circulating air is subjected, and a heat regulator intermediate the heater and the circulator responsive to the temperature of the air entering the circulator to control the heater and maintain the air temperature at a substantially constant predetermined level.

2. The herein described method of maintaining uniform the dimensions of precision articles subject to expansion and contraction under handling by an operator, including subjecting the articles to the influence of a heating medium, maintaining the heating medium at a temperature substantially equal to or slightly above body temperature of the operator, warming the articles by contact with the heating medium, the mode of procedure and steps thereof being such that the articles are maintained at a substantially constant temperature level equal to or slightly higher than the body temperature of the operator's hands with which the articles come in contact.

3. The herein described method of manufacturing, inspecting or assembling precision parts including subjecting the parts to thermal conditioning influence at a temperature level substantially equal to the body temperature of an operator handling the parts and controlling the temperature of the parts to maintain therein a substantially balanced condition of expansive and contractive influence while being handled by an operator to maintain the prescribed dimensions thereof.

4. The method of manufacturing, inspecting or assembling precision parts, including the steps of placing the parts in a relatively small, illuminated box or compartment providing access for the hands of the operator, and establishing and maintaining a temperature level in said box approximately equal to the body temperature of the operator.

5. The method of manufacturing, inspecting or assembling precision parts, including the steps of defining a relatively small enclosure providing access for the hands of an operator, placing the parts in said enclosure as well as the tools to be used on said parts, establishing a temperature in said enclosure approximately equal to the body temperature of the operator, and maintaining said temperature while the operator, standing exteriorly of the enclosure, inserts his hands into the enclosure and manipulates the parts and tools without appreciable heat exchange between his hands and the parts and tools.

JAMES O. GARRISON.

REFERENCES CITED

The following references are of record in the file of this patent:

UNITED STATES PATENTS

| Number | Name | Date |
| --- | --- | --- |
| 1,410,065 | Keller | Mar. 21, 1922 |
| 1,642,577 | Carson | Sept. 13, 1927 |
| 2,134,474 | Gillespie | Oct. 25, 1938 |
| 2,159,082 | Hartley | May 23, 1939 |
| 2,245,220 | Nelson | June 10, 1941 |
| 2,248,867 | Hallman, Sr. | July 8, 1941 |
| 2,299,867 | Wolfson | Oct. 27, 1942 |

FOREIGN PATENTS

| Number | Country | Date |
| --- | --- | --- |
| 620,872 | France | Jan. 25, 1927 |